(12) United States Patent
Chen et al.

(10) Patent No.: US 9,227,550 B2
(45) Date of Patent: Jan. 5, 2016

(54) MULTI-STAGE TRANSMISSION TENSIONING DEVICE FOR AUTOMOBILE SAFETY

(75) Inventors: Weiguo Chen, Zhejiang (CN); Wei Deng, Zhejiang (CN); Jianbiao Li, Zhejiang (CN)

(73) Assignee: NINGBO XULI METAL PRODUCTS CO., LTD., Yongle Village, Wuxiang Town, Yinzhou District, Ningbo, Zhejiang (CN)

( * ) Notice: Subject to any disclaimer, the term of this patent is extended or adjusted under 35 U.S.C. 154(b) by 194 days.

(21) Appl. No.: 13/991,276

(22) PCT Filed: Jul. 11, 2011

(86) PCT No.: PCT/CN2011/001137
§ 371 (c)(1),
(2), (4) Date: Jun. 3, 2013

(87) PCT Pub. No.: WO2012/162860
PCT Pub. Date: Dec. 6, 2012

(65) Prior Publication Data
US 2013/0247340 A1 Sep. 26, 2013

(30) Foreign Application Priority Data
Jun. 2, 2011 (CN) .......................... 2011 1 0149937

(51) Int. Cl.
*A43C 11/00* (2006.01)
*B60P 7/08* (2006.01)
*B62J 7/08* (2006.01)

(52) U.S. Cl.
CPC .. *B60P 7/083* (2013.01); *B62J 7/08* (2013.01); *Y10T 24/2117* (2015.01)

(58) Field of Classification Search
CPC .......... B60P 7/083; B65D 63/08; B65G 7/12; B66C 1/18; F16G 11/00; A44B 11/124; Y10T 24/2175; F10T 24/2177
USPC ........ 24/69 ST, 68 CD, 69 CT; 254/237–241, 254/213–219
See application file for complete search history.

(56) References Cited

U.S. PATENT DOCUMENTS

| | | | | |
|---|---|---|---|---|
| 2,146,104 A | * | 2/1939 | Adamson | 254/218 |
| 5,401,216 A | * | 3/1995 | Fujikawa | 474/130 |
| 5,769,345 A | * | 6/1998 | Morner et al. | 242/375.3 |
| 5,855,045 A | * | 1/1999 | Miura | 24/68 CD |
| 6,405,960 B2 | * | 6/2002 | Yano | 242/375.3 |
| 8,905,379 B2 | * | 12/2014 | Huang | 254/219 |

(Continued)

*Primary Examiner* — Robert J Sandy
*Assistant Examiner* — Matthew Sullivan
(74) *Attorney, Agent, or Firm* — Global IP Services; Tianhua Gu

(57) ABSTRACT

A multi-stage transmission tensioning device for automobile safety comprises a base group (1), a handle group (2) and a multi-stage transmission group (3); the multi-stage transmission group (3) comprises a transmission shaft (25) for pivoting both with the base of the base group (1) and the handle of the handle group (2), a main rotating shaft (28) used for winding a long strap (31), and a transmission wheel fixed on the transmission shaft (25). A fairly large binding force on the straps ultimately can be achieved from a small force applied to the handle by multiple conversions. Different binding forces in the case of applying the same handle force may be got via the increase or decrease of the transmission stages and the change of the transmission ratio of the transmission at all stages.

9 Claims, 8 Drawing Sheets

(56) References Cited

U.S. PATENT DOCUMENTS

2003/0193046 A1* 10/2003 Chen .............................. 254/243
2014/0041166 A1* 2/2014 Yanagawa et al. .......... 24/69 ST

* cited by examiner

US 9,227,550 B2

MULTI-STAGE TRANSMISSION TENSIONING DEVICE FOR AUTOMOBILE SAFETY

CROSS REFERENCE TO RELATED PATENT APPLICATION

The present application is the US national stage of PCT/CN2011/001137 filed on Jul. 11, 2011, which claims the priority of the Chinese patent application No. 201110149937.1 filed on Jun. 2, 2011, which application is incorporated herein by reference.

FIELD OF THE INVENTION

The present invention relates to a tensioning device for automobile safety which can be used for easily winding the strap on the goods on a variety of cars, trucks, trailers and motorcycles.

PRIOR ART OF THE INVENTION

The tensioning device for automobile safety usually comprises a tensioning device host, a long strap and a short strap, of which the host part adopts the mechanism principle of the anti-reverse ratchet wheel. The handle directly drives the active pawl which rotates the ratchet wheel. While the ratchet wheel directly drives the main rotating shaft, tightening the straps winding on the main rotating shaft. And the locking pawl prevents the reverse of the ratchet wheel, facilitating the straps to be capable of maintaining a certain tension and tying up the goods.

In accordance with the relevant principles of the mechanics, when a certain force of manpower is applied on the handle, a larger binding force will be put on the strap. The binding force is relatively fixed, mainly depending on the length of the handle. If the binding force is too small to properly tie up the goods, it will cause a traffic safety hazard. Therefore, the increase of the binding force is the direction of the joint efforts of the industry.

If the forces applied on the handle are the same and it requires increasing the binding force, the general approach is to increase the length of the handle, i.e. lengthening the arm of force. Thus, the entire device will be very long and costly and not convenient to carry, transport and operate. Some tensioning device is designed with a folding handle or telescopic handle. Although it can be used with the short handle when in carrying and transportation while with the long handle when in operation, the structure is complicated and not convenient to operate and is costly.

SUMMARY OF THE INVENTION

It is an object of the present invention to provide a tensioning device for automobile safety with a new structure and being easy to achieve a larger binding force.

For achieving the above stated object, the multi-stage transmission tensioning device for automobile safety comprises a base group having a base and a handle group having a handle; wherein the base group and the handle group are connected through a multi-stage transmission group; the multi-stage transmission group comprises a transmission shaft for pivoting both with the base of the base group and the handle of the handle group, a main rotating shaft fixed on the base and used for winding a long strap, and a transmission wheel fixed on the transmission shaft; the transmission wheel realizes a rotation state required for binding, a non-rotation state required for locking, and a free state required for unlocking under the action of the base group and the handle group.

Preferably, the transmission wheel is a ratchet wheel; and the handle group comprises an active pawl mounted on the handle and matched with the ratchet wheel, and an active pawl spring acting on the active pawl, the active pawl can push the ratchet wheel to rotate achieving the rotation state required for binding.

Preferably, the base group comprises a locking pawl mounted on the base and a locking pawl spring acting on the locking pawl, the locking pawl locks the transmission wheel reversely under the action of the locking pawl spring achieving the non-rotation state required for locking the transmission wheel.

Preferably, the active pawl mounted on the handle and the locking pawl mounted on the base are respectively located at the same side of the transmission shaft, when the handle is not opened; the front portion of the handle is in cam-shaped which can push the locking pawl, the base has two side walls, and two releasing notches are respectively formed on the upper edges of the two side walls of the base which are provided for the active pawl to get in and be locked, and the free state required for releasing the transmission wheel is achieved under the action of the front portion of the handle and the releasing notches.

Preferably, the multi-stage transmission group is a two-stage transmission group, and the transmission group further comprises a driving gear coaxially fixed with the ratchet wheel and a passive gear fixed on the main rotating shaft and is engaged with the driving gear. The ratchet wheel and the driving gear both on the transmission shaft are separated by a gasket which is mounted on both the main rotating shaft and the transmission shaft, and the gasket has through holes for the main rotating shaft and the transmission shaft to pass through.

Preferably, the transmission group is a transmission group with more than two stages, the transmission group further comprises a driving gear coaxially fixed with the ratchet wheel, and a final-stage passive gear provided on the main rotating shaft; the driving gear is engaged with the next-stage passive gear, and an intermediate-stage passive gear is fixed on an intermediate transmission shaft which is mounted on the base; the final-stage passive gear is engaged with the last-stage passive gear.

Preferably, the handle of the handle group is composed of two handle side plates combined together by a handle fixing plate and a handle fixing shaft, the two handle side plates is provided with corresponding mounting holes for receiving the transmission shaft and the active pawl; three pins are extended from the rear portion of the active pawl, and the handle fixing plate is provided with three through holes for three pins of the active pawl to pass through, the ends of the two side pins are respectively connected with a puller, and the middle pin is sleeved with the active pawl spring and the end of the middle pin passes through the corresponding through hole.

Preferably, the base of the base group is composed of two base side plates combined together by a base fixing plate and a base fixing shaft, and the two base side plates is provided with corresponding mounting holes for receiving the main rotating shaft, the transmission shaft and the locking pawl; a pin is extended from the rear portion of the locking pawl, and the base fixing plate is provided with a through hole for the pin of the locking pawl to pass through; the pin of the locking pawl is sleeved with the locking pawl spring the two ends of which are respectively against the base fixing plate and the locking pawl; the two base side plates are also provided with a bolt and a nut for connecting a short strap.

In the operation, the handle group is pushed away to drive the active pawl, the ratchet wheel is driven to rotate by the active pawl, then the transmission shaft is driven to rotate by the rotating ratchet wheel, finally the passive wheel is further driven to rotate by the rotating transmission shaft. As the gears are engaged with each other, the driving gear drives the passive gear to rotate in an opposite direction, ultimately driving the main rotating shaft to wind the strap.

Compared with the prior art, in this invention, with the use of multi-stage transmission, a fairly large binding force on the straps ultimately may be achieved from a small force applied to the handle by multiple conversions. Different binding forces in the case of applying the same handle force may be got via the increase or decrease of the transmission stages and the change of the transmission ratio of the transmission at all stages.

DETAILED DESCRIPTION OF THE PREFERRED EMBODIMENT

To enable a further understanding of the innovative and technological content of the invention herein, refer to the detailed description of the invention and the accompanying drawings below:

Embodiment 1

The tensioning device for automobile safety shown in FIGS. 1, 2, 3, 4 and 5, comprises a base group 1, a handle group 2 and a multi-stage transmission group 3.

Figure 8A:
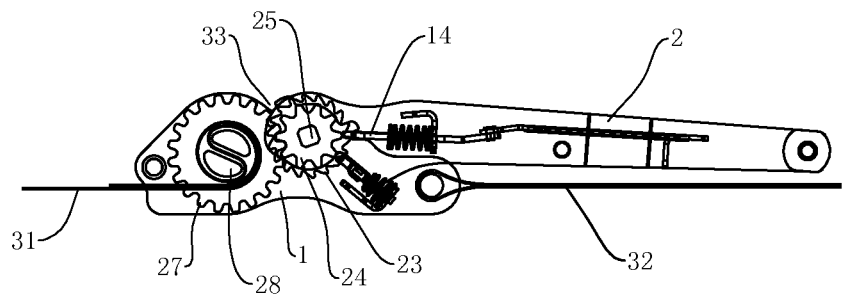
FIG. 8a, FIG. 8b and FIG. 8c are schematic views of the operation of the tensioning device in accordance with the first embodiment of the present invention.

The base group 1 is composed of a base, a locking pawl 10 and a locking pawl spring 11, etc., wherein the base of the base group 1 is composed of two base side plates 4 with the same structure combined together by a base fixing plate 7 and a base fixing shaft 6(the two side walls of the base of claim 4 is formed by the two base side plates). The two base side plates 4 are not only provided with mounting holes for receiving the fixing plate 7 and the fixing shaft 6, but also provided with mounting holes for receiving the main rotating shaft 28, the locking pawl 10 and a plurality of transmission shafts. In addition, the upper edges of the two base side plates 4 is in concave-convex-shaped, and two releasing notches 33 are respectively formed for the active pawl (14) to get in and be locked. The base fixing plate 7 and the locking pawl 10 are obliquely mounted on the base after being inserted in the corresponding holes in the base side plates 4 respectively through two side portions. The upper portion of the locking pawl 10 turns toward the transmission shaft to match with the ratchet wheel 23 fixed on the transmission shaft 25. A pin is extended from the rear portion of the locking pawl 10, which is sleeved with the locking pawl spring 11. A baffle plate is upwardly folded on the rear portion of the base fixing plate 7, which is provided with a through hole for receiving the pin of the locking pawl 10 to pass through. The pin of the locking pawl 10 is sleeved with the locking pawl spring 11 the two ends of which are respectively against the locking pawl 10 and the baffle plate of the base fixing plate 7, resulting in that the locking pawl 10 always drives toward the ratchet wheel 23 under the action of the force of the spring. When the handle is in a closed status after the goods is tied up, the locking pawl 10 is engaged with the ratchet of the ratchet wheel 23 (as shown in FIG. 8a) to prevent the reverse of the ratchet wheel 23, facilitating the straps to be capable of maintaining a certain tension and tying up the goods. A bolt 8 is mounted in the rear portion of the base, which is tightened by a nut 9 after passing through the hole in the two base side plates 4. The short strap 32 is then connected to the bolt 8.

The handle group 2 is composed of a handle, an active pawl 14 and an active pawl spring 17, etc. wherein the handle is composed of two handle side plates 13 with the same structure combined together by a handle fixing plate 19 and a handle fixing shaft 18. In addition, two handle side plates 13 are not only provided with mounting holes for receiving the handle fixing plate 19 and the handle fixing shaft 18, but also provided with mounting holes 21 for receiving the transmission shaft 25 and mounting holes for receiving an active pawl 14. The front portions 22 of the two handle side plates 13 are in cam-shaped which can push the locking pawl 10 to be separated from the ratchet wheel 23. The handle fixing plate 19 and the active pawl 14 are mounted on the handle after being inserted in the corresponding holes in the handle side plates 13 respectively through two side portions. The end portion of the active pawl 14 turns toward the transmission shaft 25 to correspond to the ratchet wheel 23 mounted on the transmission shaft. The rear portion of the active pawl 14 is provided with three pins extended backwardly, and correspondingly the handle fixing plate 19 in the rear portion is provided with a downwardly folded baffle with three through holes for three pins of the active pawl 14 to pass through, wherein two pins are connected with a puller 15 by a rivet, and one pin is sleeved with an active pawl spring 17 before extending through a corresponding through hole of the handle fixing plate 19, resulting in that the active pawl spring 17 pushes against the active pawl 14 and the baffle plate of the handle fixing plate 19. The active pawl 14 always drives toward the ratchet wheel 23 under the action of the force of the spring 17. In addition, a knob is mounted in the rear portion of the handle. In this embodiment, when the handle is in a closed status, the active pawl 14 of the handle and the locking pawl 10 of the base are at the same side of the transmission shaft 25.

Figure 1:
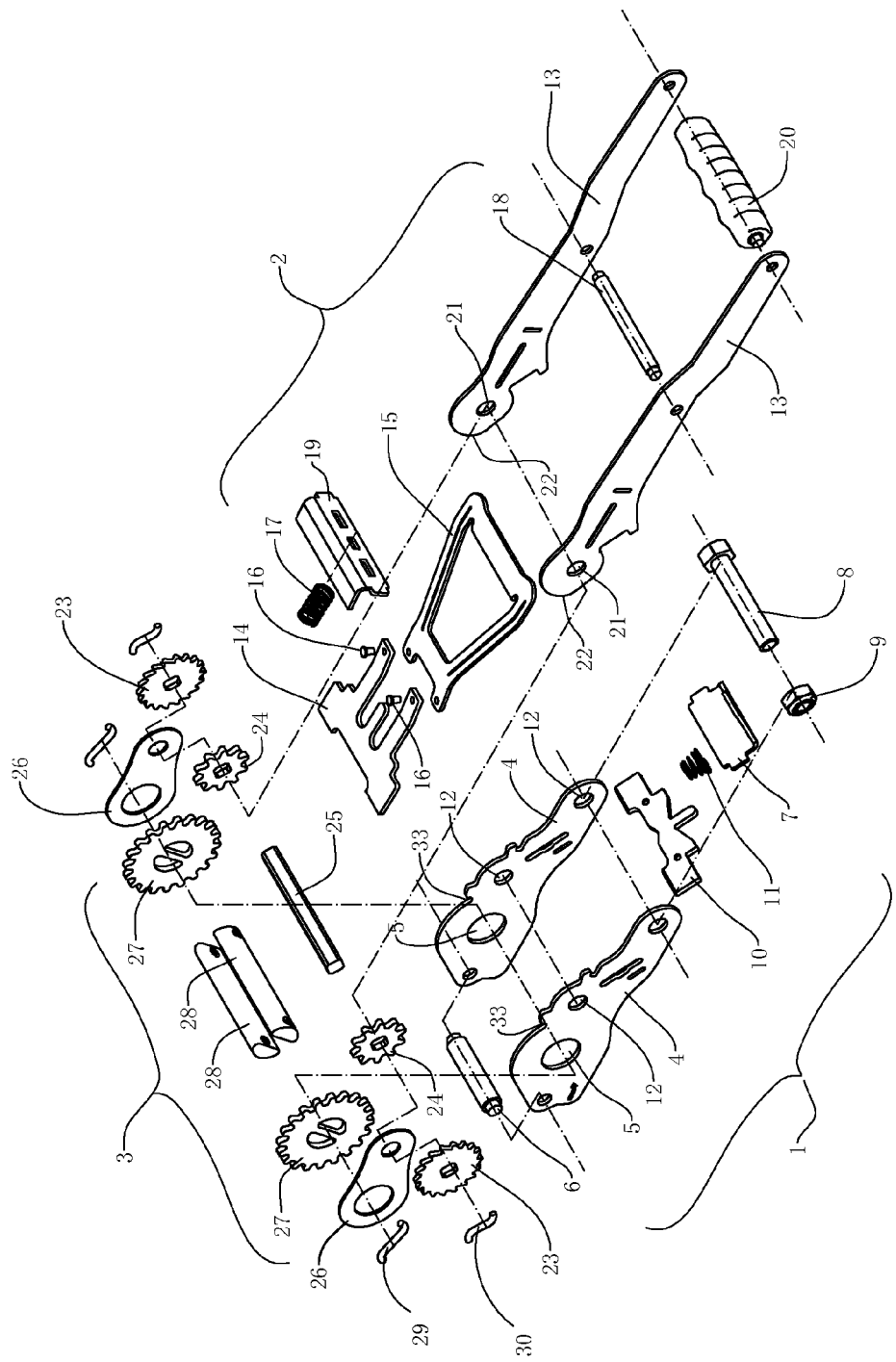
FIG. 1 is an exploded view of a tensioning device for automobile safety in accordance with the first embodiment of the present invention.
Figure 2:
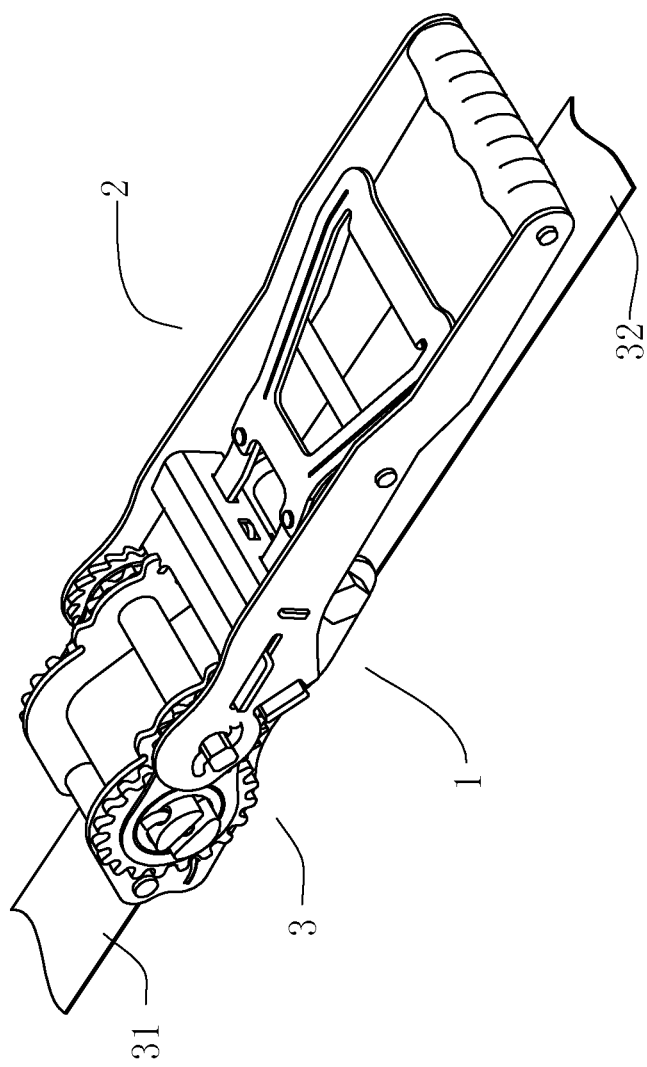
FIG. 2 is a perspective view of the tensioning device in accordance with the first embodiment of the present invention.
Figure 3:
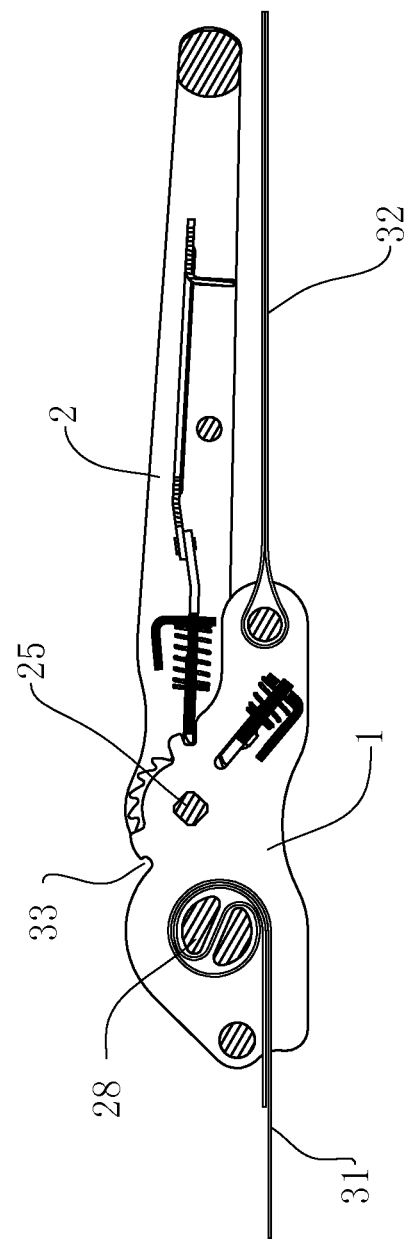
FIG. 3 is a sectional view of the tensioning device in accordance with the first embodiment of the present invention.
Figure 4:
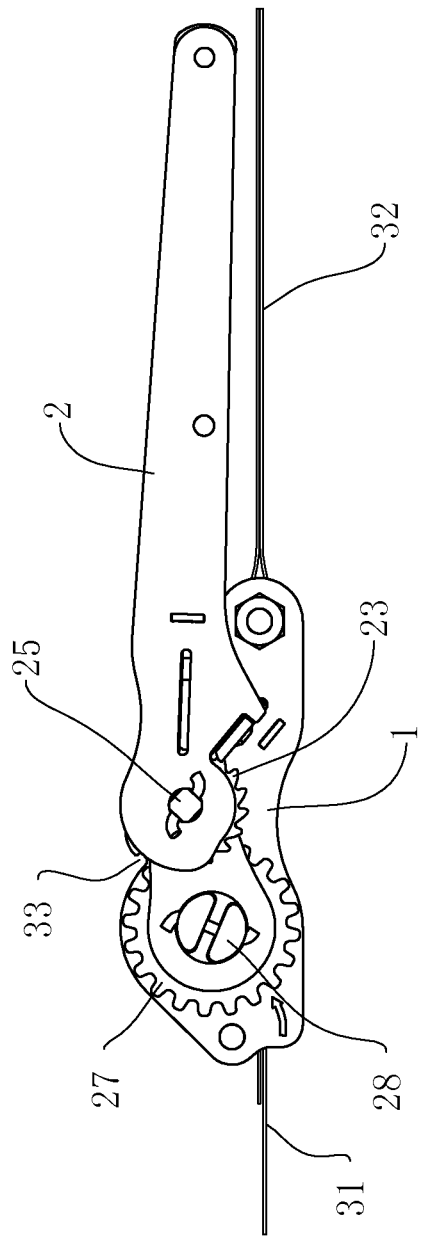
FIG. 4 is a front view of the tensioning device in accordance with the first embodiment of the present invention.
Figure 5:
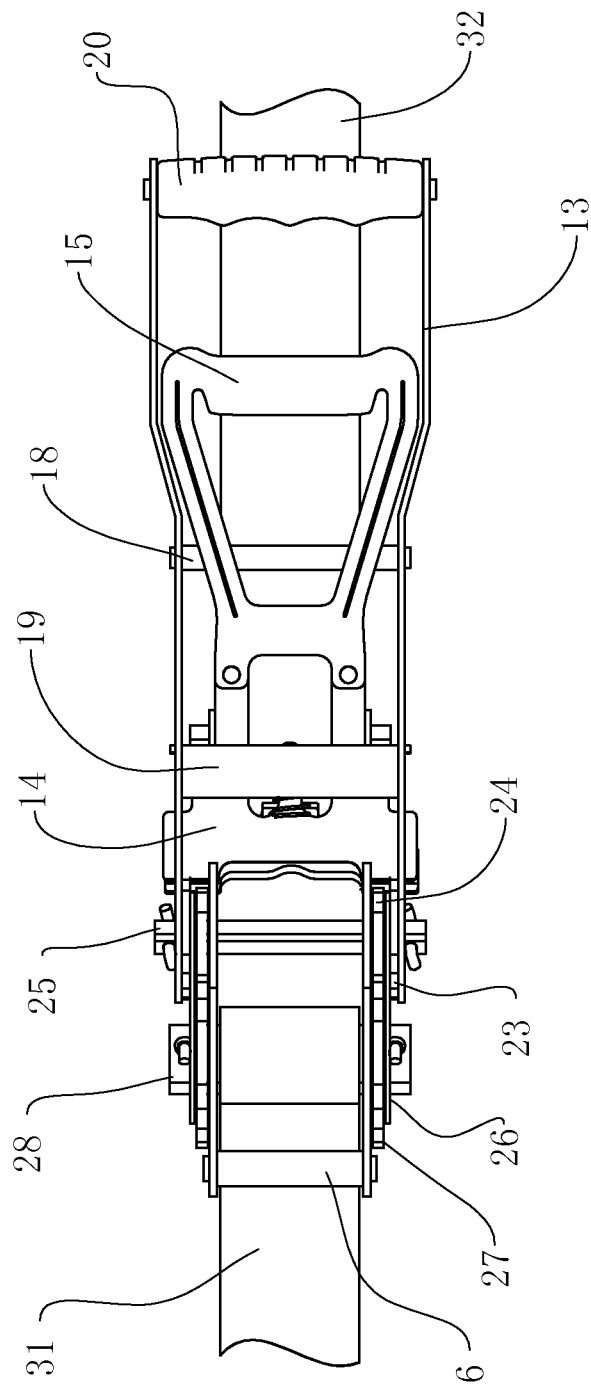
FIG. 5 is a top plan view of the tensioning device in accordance with the first embodiment of the present invention.
Figure 6:
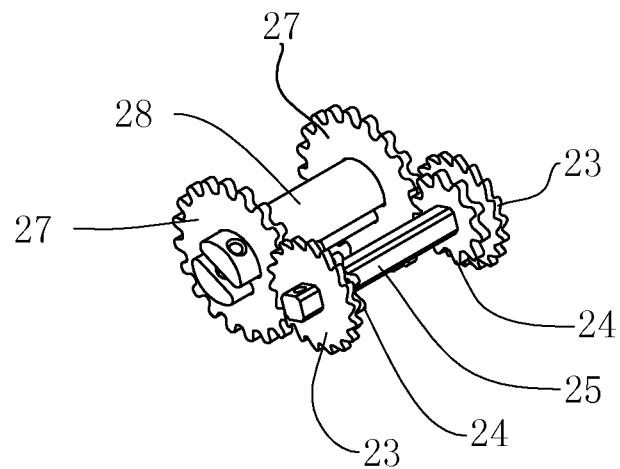
FIG. 6 is a perspective view of the transmission part in accordance with the first embodiment of the present invention.

In this embodiment, the multi-stage transmission group is a two-stage transmission group, as shown in FIG. 6, which further comprises a ratchet wheel 23, a driving gear 24, a transmission shaft 25, a main rotating shaft 28 and a passive gear 27, etc., wherein the main rotating shaft 28 mounted in the main rotating shaft hole 5 of the base is composed by two semicircle shafts. The long strap 31 is winded on the main rotating shaft 28. Both ends of the main rotating shaft 28 are combined and limited through a pin 29 after it is mounted on the base. Two semicircle holes are formed on the passive gear 27 for receiving two semicircle shafts. Two passive gears 27 are respectively mounted at both ends of the main rotating shaft 28 and located on the outer sides of the base side plates 4. The transmission shaft 25 is located at the rear of the main rotating shaft 28 and arranged in parallel with the main rotating shaft 28. A hole 12 and a hole 21 for receiving the transmission shaft are formed in the base and the handle. The transmission shaft 25 is limited by a pin 30 after passing through the corresponding holes. The base and the handle are pivoted with each other via the transmission shaft 25, which facilitates the handle to rotate relatively to the base. A ratchet wheel 23 and a driving gear 24 are respectively mounted at both ends of the transmission shaft 25 with the ratchet wheel 23 matched with the active pawl 14 and the locking pawl 10 and the driving gear 24 matched with and engaged with the passive gear 27. And the ratchet wheel 23 and the driving gear 24 both on the transmission shaft 25 are separated by a gasket 26 which is mounted on both the main rotating shaft 28 and the transmission shaft 25, and the gasket 26 has through holes for the main rotating shaft 28 and the transmission shaft 25 to pass through.

Figure 7:
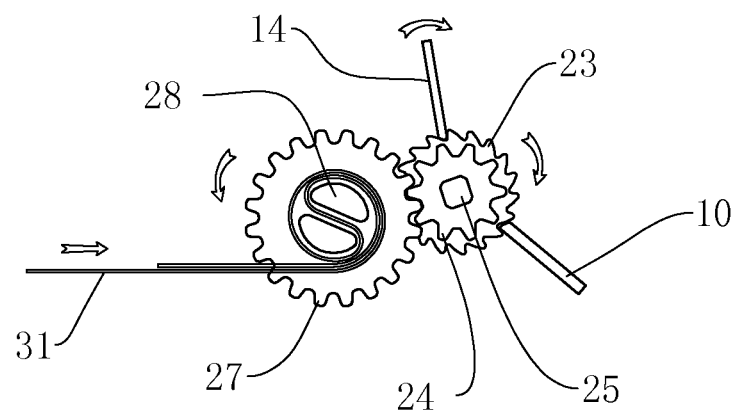
FIG. 7 is a schematic view of the transmission relationship in accordance with the first embodiment of the present invention.

When in the transmission of the two-stage transmission mechanism (shown in FIG. 7), the ratchet wheel 23 is driven to rotate by the handle group 2, while the transmission shaft 25 is further driven to rotate by the ratchet wheel 23. As the driving gear 24 is fixed on the transmission shaft 25, the driving gear 24 is rotated with the transmission shaft 25 and is engaged with the passive gear 27, driving the passive gear 27 to rotate in an opposite direction. While the passive gear 27 is fixed on the main rotating shaft 28, driving the rotation of the main rotating shaft 28, which causes the long strap 31 to wind on the main rotating shaft 28. Thus, the operation of the handle is repeated to tighten the straps and tie up the goods.

With the combination of FIG. 8a-8c, the dynamic process of the tensioning device of the Invention when in use is described as below:

As shown in FIG. 8a, the tensioning device is in a locked status.

Figure 8B:
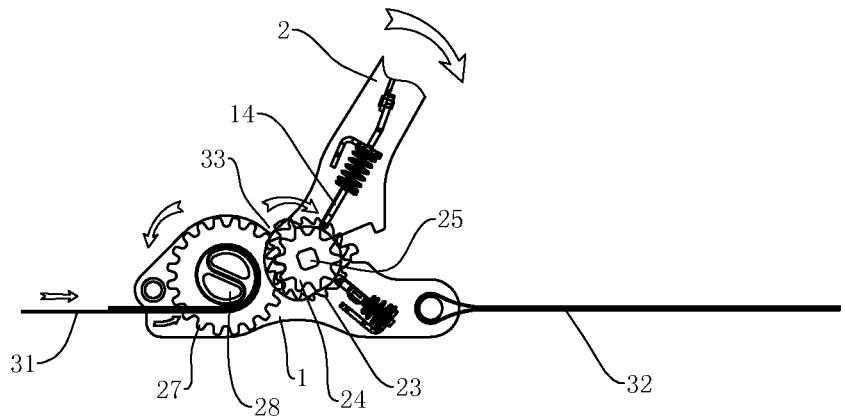

When in operation, as shown in FIG. 8b, a force is applied on the handle group 2 and the ratchet wheel 23 is pushed to rotate by the active pawl 14 connected with the handle group 2, while the transmission shaft 25 is driven to rotate by the ratchet wheel 23 drives and the driving gear 24 is driven to rotate toward the same direction by the transmission shaft 25. The passive gear 27 engaged with the driving gear is driven to rotate toward the opposite direction by the driving gear 24, so that the main rotating shaft 28 is driven to rotate and wind the long strap 31 on the main rotating shaft 28. The operation of the handle is repeated to obtain the necessary binding force and tie up the goods.

After the operation is completed, the handle group 2 is folded to the locking status, as shown in FIG. 8a. Then the locking pawl 10 and the ratchet on the ratchet wheel 23 are engaged with each other and the ratchet wheel 23 is non-rotatable.

Figure 8C:
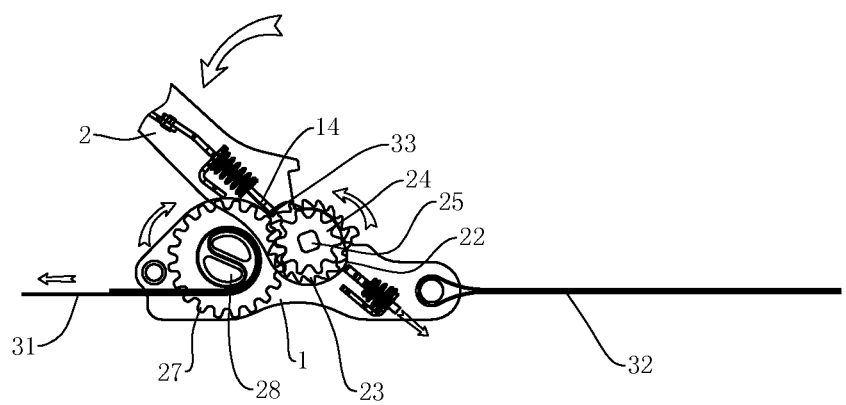

The handle group 2 is open when released, as shown in FIG. 8c. The active pawls 14 are placed in two releasing notches 33 of the base side plates 4. Meanwhile, the locking pawl 10 is pushes against by the front portion 22 of the handle side plate 13, leading the ratchet wheel 23 and two pawls 10 and 14 to get away, which can be inverted. Then the multi-stage transmission group 3 is in a freely rotatable state, so as to release the tension on the long strap 31.

Embodiment 2

The difference of this embodiment compared with Embodiment 1 is that: the multi-stage transmission mechanism above two-stage is adopted for the multi-stage transmission group. More transmission pairs can be added between the first-stage transmission and the final-stage transmission. The specific can be carried out as follows: the transmission shaft of Embodiment 1 is taken as one-stage transmission shaft, the driving shaft is provided with the ratchet wheel and the driving gear, while the driving gear is engaged with the gear of the next-stage transmission shaft. The main rotating shaft is taken as the final-stage transmission shaft, the main rotating shaft is fixed with a passive gear engaged with the gear of the previous-stage transmission shaft. By adding the second, third or more stages of transmission gear group between the first stage and the final stage, the required binding force may be obtained. The middle-stage transmission shaft is between the first-stage transmission shaft and the final-stage transmission shaft, which can be mounted in the shaft holds preset in the base.

Embodiment 3

Figure 9:
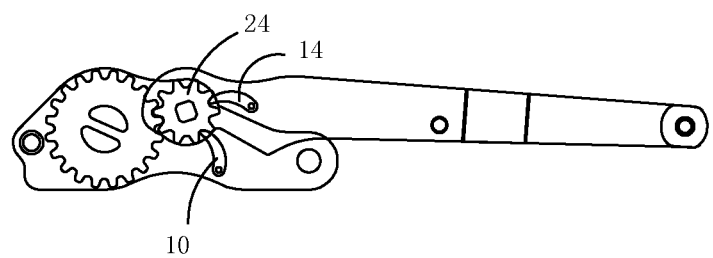
FIG. 9 is a front view of a tensioning device for automobile safety in accordance with the third embodiment of the present invention.

As shown in FIG. 9, the difference of this embodiment compared with Embodiment 1 and Embodiment 2 is that: The ratchet wheel is not required but the driving gear is directly used as a ratchet wheel (i.e. the transmission wheel in claim 1 is the driving gear). The active pawl and the locking pawl are directly touched the driving gear, achieving the same function without the ratchet wheel. This embodiment is mainly to have adaptability changes to the driving gear and the active ratchet wheel as well as the locking ratchet wheel. The rest of the structure is substantially the same as the previous embodiments. Therefore, the details will not be described here.

However, in addition to those set forth in the above embodiments of the invention, different types of modification can also be carried out, but not limited to the above three solutions. For example, the gear transmission is used for the transmission group as described previously. In fact, other forms of gear transmission or chain wheel transmission may be used for the multi-stage transmission group of the invention, as long as such type of transmission can realize the transmission of force between the first-stage transmission shaft provided with a transmission wheel and the final-stage transmission shaft connected with long straps, achieving the required binding force. Moreover, the positions and directions of the ratchet wheel and the gear and the positions and directions of the active pawl and the passive pawl may also be different from those shown in the figures of Embodiment 1, which can be mounted in a different position of the tensioning device but still have the same function.

The invention claimed is:

1. A multi-stage transmission tensioning device for automobile safety, comprising a base group (1) having a base and a handle group (2) having a handle;
    wherein the base group (1) and the handle group (2) are connected through a multi-stage transmission group (3);
    the multi-stage transmission group (3) comprises a transmission shaft (25) for pivoting both with the base of the base group (1) and the handle of the handle group (2), a main rotating shaft (28) fixed on the base and used for winding a long strap (31), and a transmission wheel fixed on the transmission shaft (25);
    the transmission wheel realizes a rotation state required for binding, a non-rotation state required for locking, and a free state required for unlocking under the action of the base group (1) and the handle group (2);
    a handle of the handle group (2) is composed two handle side plates (13) combined together by a handle fixing plate (19) and a handle fixing shaft (18), the two handle side plates (13) is provided with corresponding mounting holes for receiving the transmission shaft (25) and an active pawl (14);

three pins are extended from the rear portion of the active pawl (14), and the handle fixing plate (19) is provided with three through holes for three pins of the active pawl (14) to pass through, the ends of the two side pins are respectively connected with a puller (15), and the middle pin is sleeved with an active pawl spring (17) and the end of the middle pin passes through the corresponding through hole.

2. The multi-stage transmission tensioning device of claim 1, wherein the transmission wheel is a ratchet wheel (23); and the active pawl (14) mounted on the handle and matched with the ratchet wheel (23), and the active pawl spring (17) acting on the active pawl (14), the active pawl (14) can push the ratchet wheel (23) to rotate achieving the rotation state required for binding.

3. The multi-stage transmission tensioning device of claim 1, wherein the base group (1) comprises a locking pawl (10) mounted on the base and a locking pawl spring (11) acting on the locking pawl (10), the locking pawl (10) locks the transmission wheel reversely under an action of the locking pawl spring (11) achieving a non-rotation state required for locking the transmission wheel.

4. The multi-stage transmission tensioning device of claim 3, wherein the active pawl (14) mounted on the handle and the locking pawl (10) mounted on the base are respectively located at the same side of the transmission shaft (25), when the handle is not opened;

a front portion (22) of the handle is in cam-shaped which can push the locking pawl (10), the base has two side walls, and two releasing notches (33) are respectively formed on upper edges of the two side walls of the base which are provided for the active pawl (14) to get in and be locked, and a free state required for releasing the transmission wheel is achieved under an action of the front portion (22) of the handle and the releasing notches (33).

5. The multi-stage transmission tensioning device of claim 2, wherein the multi-stage transmission group (3) is a two-stage transmission group, and the multi-stage transmission group further comprises a driving gear (24) coaxially fixed with the ratchet wheel (23) and a passive gear (27) fixed on the main rotating shaft (28) and is engaged with the driving gear (24).

6. The multi-stage transmission tensioning device of claim 2, wherein the transmission group is a transmission group with more than two stages, the transmission group further comprises a driving gear (24) coaxially fixed with the ratchet wheel (23), and a final-stage passive gear (27) provided on the main rotating shaft (28);

the driving gear (24) is engaged with a next-stage passive gear, and an intermediate-stage passive gear is fixed on an intermediate transmission shaft which is mounted on the base; the final-stage passive gear (27) is engaged with a last-stage passive gear.

7. The multi-stage transmission tensioning device of claim wherein a base of the base group (1) is composed of two base side plates (4) combined together by a base fixing plate (7) and a base fixing shaft (6), and the two base side plates (4) is provided with corresponding mounting holes for receiving the main rotating shaft (28), the transmission shaft (25) and the locking pawl (10);

a pin is extended from the rear portion of the locking pawl (10), and the base fixing plate (7) is provided with a through hole for the pin of the locking pawl (10) to pass through; the pin of the locking pawl (10) is sleeved with the locking pawl spring (11) the two ends of which are respectively against the base fixing plate (7) and the locking pawl (10); the two base side plates (4) are also provided with a bolt (8) and a nut (9) for connecting a short strap (32).

8. The multi-stage transmission tensioning device of claim 5, wherein the ratchet wheel (23) and the driving gear (24) both on the transmission shaft (25) are separated by a gasket (26) which is mounted on both the main rotating shaft (28) and the transmission shaft (25), and the gasket (26) has through holes for the main rotating shaft (28) and the transmission shaft (25) to pass through.

9. The multi-stage transmission tensioning device of claim 3, wherein the locking pawl spring (11) acts on the locking pawl (10), the locking pawl (10) locks the transmission wheel reversely under an action of the locking pawl spring (11) achieving a non-rotation state required for locking the transmission wheel.

\* \* \* \* \*